(12) United States Patent
Baranov et al.

(10) Patent No.: US 6,413,482 B1
(45) Date of Patent: Jul. 2, 2002

(54) METHOD FOR REPROCESSING NUCLEAR FUEL BY EMPLOYING OXIMES

(75) Inventors: Sergey Mikhailovich Baranov; Valentin Sergeevich Koltunov; Eduard Andreevich Mezhov, all of Moscow (RU); Robin John Taylor; Iain May, both of Seascale (GB); Victor Georgievich Pastuschak, Moscow (RU)

(73) Assignee: British Nuclear Fuels plc (GB)

( * ) Notice: Subject to any disclaimer, the term of this patent is extended or adjusted under 35 U.S.C. 154(b) by 0 days.

(21) Appl. No.: 09/613,646

(22) Filed: Jul. 11, 2000

(51) Int. Cl.$^7$ .......................... C22B 60/00; C01G 56/00
(52) U.S. Cl. ............................................. 423/9
(58) Field of Search .................... 423/9; 976/DIG. 279; 376/310, 311

(56) References Cited

U.S. PATENT DOCUMENTS 2,909,542 A * 10/1959 Soloway ................. 423/9
4,659,551 A    4/1987 Kolarik et al. .......... 423/10

FOREIGN PATENT DOCUMENTS

| DE | 3332954 | 3/1985 |
|---|---|---|
| EP | 0638907 | 2/1995 |
| GB | 2004407 | 3/1979 |
| JP | 05066290 | 3/1993 |
| WO | WO96/11477 | 4/1996 |
| WO | 97/30456 | * 8/1997 |
| WO | WO99/23668 | 5/1999 |
| WO | WO00/13187 | 3/2000 |
| WO | WO00/13188 | 3/2000 |

OTHER PUBLICATIONS

Sze et al., Oxidation of Pu(III) by Nitric Acid in Tri–n–Butyl Phosphate Solutions. Part II. Chemical Methods for the Suppession of Oxidation to Improve Plutonium Separation in Contactor Operation. Nuclear Technology, vol. 63, Dec. 1983, pp. 431–441.

Miguel et al., Extraction of Cu(II), Fe(III), Ga(III), Ni(III), In(III), Co(II), Zn(II), and Pb(II) with LIX® 984 dissolved in n–heptane., Hydrometallurgy 47 (1997) pp. 19–30, No Month.

Koltunov et al., Organic Manufactured Hydrazinies and Hydroxyamines in the Future Reprocessing Technology of Irradiated Fuel, © Radiokhimiya, N 6, (1993) pp1–9, No Month.

Koltunov et al., Organic Derivatives of Hydrazine and Hydroxylamine in Future Technology of Spent Nuclear Fuel Reprocessing., pp. 577–584.(1995), No Month.

* cited by examiner

Primary Examiner—Steven Bos
(74) Attorney, Agent, or Firm—Myers Bigel Sibley & Sajovec

(57) ABSTRACT

A spent nuclear fuel reprocessing method includes contacting an organic phase containing NP(VI) with an oxime of the formula $R_2C=NOH$, where each R is independently H or an organic substituent. Np(VI) is reduced to Np(V) which is then backwashed into an aqueous phase.

14 Claims, 1 Drawing Sheet

METHOD FOR REPROCESSING NUCLEAR FUEL BY EMPLOYING OXIMES

Figure 1:
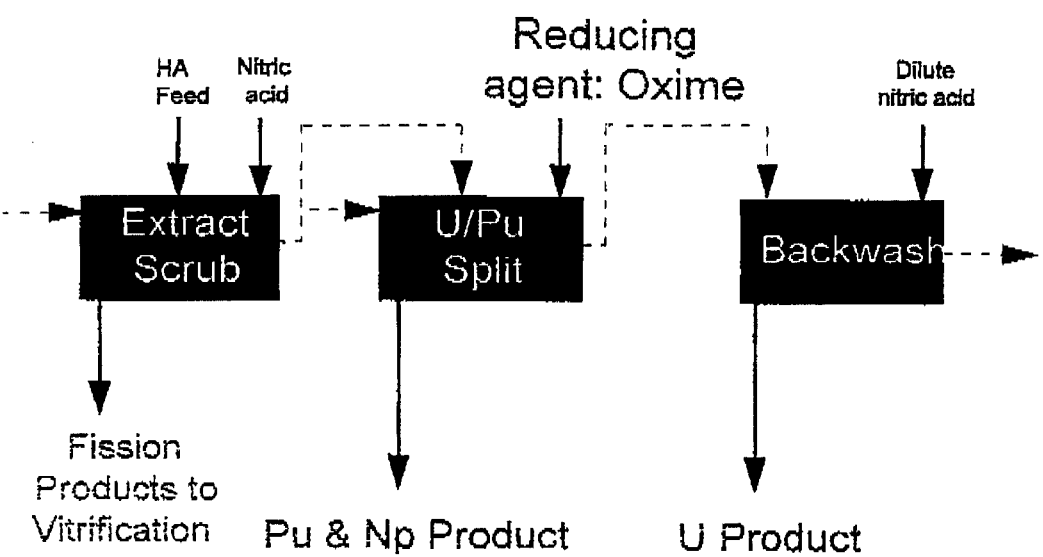

This invention relates to nuclear fuel reprocessing and is particularly concerned with the separation of Bum from plutonium and neptunium.

Most commercial reprocessing plants use the Purex process, in which the spent fuel is dissolved in nitric acid and the dissolved uranium and plutonium are subsequently extracted from the nitric acid solution into an organic phase of tributyl phosphate (TBP) dissolved in an inert hydrocarbon such as odourless kerosene. The organic phase is then subjected to solvent extraction techniques to partition the uranium from the plutonium.

More particularly, the organic phase is subjected to separation of fission products by solvent extraction and in some cases then to removal of technetium, before the so-called U/Pu split. In the U/Pu split, Pu(IV) is reduced to Pu(III) which is inextractable into the organic phase and therefore follows the aqueous stream while the U remains in the organic stream. Usually, the reducing agent used in the U/Pu split is U(IV). Np(VI) in the solvent stream is also reduced by the U(IV) to Np(IV). Np(IV) is extractable into the solvent and so exits the contactor in the solvent stream with the U product. Hydrazine nitrate is normally used to stabilise the U(IV) and Pu(III) against oxidation by, in particular, $HNO_2$. The unit for carrying out the partitioning of the U and Pu in practice comprises a contactor having a multiplicity of stages, for example six stages might be used in a modem centrifugal contactor.

There are disadvantages with such a process:

hydrazine is catalytically decomposed by Tc(VII) ions under certain conditions hydrazine can form undesirable oxidation products (e.g. ammonium salts)

U(IV) must be produced in a separate process on plant, thus increasing costs two reagents are needed Np is not separated from U so additional downstream processes are needed to remove Np from U.

It is also a disadvantage of cut commercial Purex processes that they use a three cycle flowsheet [(1) the so-called HA cycle in which fission products are separated and the U/Pu split is performed; (2) the UP cycle in which the uranium stream is purified; (3) the PP cycle in which the plutonium stream is purified]. It is therefore desired to develop an Advanced Purex process in which there is a single solvent extraction cycle.

Moreover, neptunium valency control can be a significant problem in Purex reprocessing. Neptunium is present in the Purex process as a mixture of three different valence states: Np(IV), (V) and (VI). Np(IV) and (VI) are both extractable into the solvent phase whereas Np(V) is in-extractable into this phase. In order to direct Np to raffinate streams, Np is normally stabilised in the (V) oxidation state. This is a complex matter, since not only is it the middle oxidation state of three but Np(V) also undergoes competing reactions, such as disproportionation to Np(IV) and (VI) and is oxidised to Np(VI) by nitric acid. Neptunium control is therefore difficult and efficient neptunium control is a major aim of an advanced reprocessing programme. In commercial Purex reprocessing plants, Np is typically separated from uranium during the uranium purification (UP) cycle. Np(IV) is converted to Np(V) and Np(VI) by heating in the aqueous phase in a conditioner at a high temperature. The conditioned liquor is fed to an extract and scrub mixer-settler where the Np(V) is rejected to the aqueous raffinate. Any Np(VI) present in the aqueous feed is reduced to Np(V) by hydroxylamine which is fed to the scrub section of the contactor. In a typical process, two or three mixer-settlers are required to decontaminate the uranium product from Np.

Numerous studies have been conducted to find replacements for the U(V) +hydrazine system with an efficient reductant for Pu(IV) and Np(VI). Amongst the reductants studied have been butyraldehydes, hydroquinones, substituted hydroquinones and substituted hydroxylamines, such as N-methylhydroxylamine and N,N-diethylhydroxylamine (Yu-Keung Sze, Gosselin Y. A, *Nucl. Technology*, 1983, vol 63, No. 3, pp 431–441; Koltonov V. S, Baranov S. M., *Radiokhimiya*, 1993, vol 35, No. 6, pp 11–21; Koltunov V., Baranov S., International Conference on Evaluation of Emerging Nuclear Fuel Cycle Systems (Global-95), September 1995, Versailles, France, Proceedings, vol. 1, pp 577–584).

A disadvantage of such known Np and Pu reduction processes is that their kinetics are potentially too slow for the short residence times of centrifugal or other intensified contactors which would be used in a modern Purex reprocessing plant. In particular, it is difficult to find reducing agents that rapidly reduce Pu(IV) and this is even more difficult if centrifugal contractors are to be used.

It has now been found that Np(VI) and Pu(IV) may be co-reduced by oximes (compounds of the formula $R_2C=NOH$, where $R_2$ is H or an organic substituent, especially alkyl).

The present invention provides a spent fuel reprocessing method in which an organic phase containing Np(VI) is contacted with an oxime. Preferred oximes are aldoximes of the formula $R^1HC=NOH$, where $R^1$ is an organic substituent. The organic substituent is preferably an alkyl group. Suitable organic substituents (in particular alkyl groups) include those having up to 5 carbon atoms and more especially 1, 2 or 3 carbon atoms, of which methyl and propyl are preferred. The invention includes the use of aldoximes with a substituted alkyl group; as substituents may be mentioned HONH- and hydroxy. The most preferred aldoxime is acetaldoxime which has the formula $H_3CCH=NOH$; another preferred aldoxime is butyraldoxime which has the formula $H_3CCH_2CH_2CH=NOH$. The oxime reduces Np(VI) to Np(V), which may then be backwashed into an aqueous phase.

The organic phase preferably contains U(VI) and Pu(IV) as well as Np(VI), in which case the oxime reduces the Pu(IV) to inextractable Pu(III), which may be backwashed into the aqueous phase together with the Np(V). At least in preferred processes, especially those using acetaldoxime, butyraldoxime or a homologue thereof, no reduction of Np(V) to Np(IV) occurs so no downstream purification of the U product stream is necessary. It is a significant advantage of acetaldoxime that the rate of reduction of Np(V) to Np(IV) is low. Np(V) is reduced according to:

$$\frac{-d[Np(V)]}{dt} = k[Np(V)][CH_3CHNOH][HNO_3]$$

where $k=9.2\times10^{-4} 1^{2.2} mol^{2.2} min^{-1}$ at 50° C.

If such purification should be necessary or desirable, the treated solvent (organic) phase may then be contacted with a hydrophilic complexant-reductant (preferably formohydroxamic acid) to complex with any Np(IV) and reduce any Np(VI), which is backwashed into a second aqueous phase (WO 97/30456).

In a preferred class of methods, the organic phase is contacted with the oxime and the Pu(III) plus Np(V) are backwashed in a first contactor unit into the aqueous phase. U as U(VI) remains in the organic phase and may then be backwashed into dilute nitric acid in a subsequent contactor in the usual manner. The contactors are suitably multi-stage contractors.

The invention includes a method of reducing a species selected from Np(VI) and Pu(IV) to, respectively, Np(V) and Pu(III), which method comprises contacting the species with an oxime. Of course, Np(VI) and Pu(W may be co-reduced by contacting the two species in combination with an oxime.

The present invention is further described by way of example only with reference to the accompanying drawings, in which:

FIG. 1 is a schematic flowsheet of a Purex reprocessing process incorporating a method of the invention.

FIG. 1 is therefore a flowsheet of a Purex reprocessing plant for performing a reprocessing method of the invention. In the method, an oxime (especially acetaldoxime or butyraldoxime) is used to co-reduce Np(VI) and Pu(IV) in the U/Pu split operation and the resultant Np(V) is directed with the Pu product (Pu(III)). The following symbols are used in the Figure:

Broken arrows=Solvent streams
Solid arrows=Aqueous streams

In preferred embodiments of the invention, therefore, nitric acid solution resulting from dissolution of the spent fuel (HA feed in FIG. 1) is subject to removal of fission products and possibly Tc, for example in a conventional manner. A separate Tc rejection contactor may be added. The resulting organic stream containing U, Pu, Np and, in some cases, Tc, is sent to the U/Pu split operation. Conventionally, U is present as U(VI), Pu as Pu(IV) and Np as Np(VI). In the U/Pu split, Np(VI) and Pu(IV) are co-reduced to inextractable forms, Pu(III) and Np(V), by an oxime. The oxime also reacts with $HNO_2$, so no additional scavenging agent such as hydrazine is needed.

The aqueous stream containing Np and Pu may be sent to product finishing for conversion into a solid product, for example in a conventional manner.

Optionally, the treated solvent steam is fed to an Np/Pu polishing unit to backwash any remaining Np or Pu into an aqueous stream. The two Np, Pu-containing aqueous streams may be combined and fed to a uranium extraction unit to re-extract any uranium into a solvent steam, prior to conversion of the Np, Pu into a solid product. The Pu, Np product may either be disposed of or used in the manufacture of MOX fuel (MOX=Mixed Oxide (U+Pu)).

In a second embodiment in accordance with the present invention, Np is removed from the uranium product solvent stream in a reductive strip contactor using an oxime as a reductant for Np(VI), after backwashing of the Pu from the solvent stream during a U/Pu split operation. Np-237 can then be disposed of in a conventional manner.

In preferred embodiments, the method of the invention dispenses with the separation of Pu and Np, which is used in commercial reprocessing plants. Accordingly, the plant may be smaller and the solvent and aqueous flows are reduced, resulting in both environmental and economic benefits. The method features excellent Np control (U, Np separation) in using only an oxime to reduce Np. Both Pu and Np may be efficiently separated from the U-loaded solvent stream.

A yet further benefit of preferred methods of the invention is that no U(IV) is used as a reductant. Therefore, no U(IV) is backwashed with the Pu, Np product, which is thus purer. The process gives an opportunity for the number of stages in the U/Pu split operation to be decreased. Moreover, no depleted U(IV) is added to the 235U to be recovered and the final U stream is therefore more suitable for a uranium enrichment process. Also no U(IV) needs to be produced in a separate process plant or purchased thus giving added economic benefits.

Conventional Purex processes may include, after fission product separation, a Tc separation operation. The reason for this is that the hydrazine nitrate customarily used to stabilise U(IV) and Pu(III) takes part in autocatalytic reactions with Tc and this leads to additional undesirable consumption of hydrazine. In preferred methods of the present invention, no U(IV) is added. Moreover, preferred oximes which react with Tc only very slowly, act as a nitrous acid scavenger and so reduce Pu(I) Oxidation. Accordingly, hydrazine may be dispensed with and, if a low Tc specification is acceptable for the Pu, Np product and U product, the Tc removal step may also be dispensed with.

It will be appreciated that the above-described process exemplifies a Purex reprocessing method, in which the active solvent feed entering the U/Pu split operation is treated with an oxime to reduce Pu(IV) to Pu(III) and Np(VI) to Np(V). Those reduced species are backwashed into an aqueous stream and the treated solvent stream is fed to a U backwash.

The invention thus enables the production of a Pu,Np product from nuclear reprocessing. This is beneficial because Np is a "burnable" neutron poison and if Pu is reused as a fuel it does not matter if Np is present. Furthermore it is an advantage to produce impure Pu products in that it prevents proliferation of nuclear weapons. Finally, it is better to remove Np with Pu than with U because U is not very radioactive and Np would be a significant α-active contaminating product.

Uranium and/or plutonium recovered using a method of the invention may be formed into fissile material suitable for use in power general, for example a fuel pellet. Exemplary fissile material is MOX fuel.

EXAMPLE 1

The first and second order rate constants were determined for the reaction of acetaldoxime with Np(VI) and Pu(IV), respectively. The time of reaction completion was also determined. The results are shown in Table 1 below:

TABLE 1

Rate constants and time of reaction completion with Np(VI) and Pu(IV)
The results were determined at $[CH_3CHNOH] = 0.1$ M, $[HNO_3] = 1.0$ M, $[Np(VI)] = 1.7 \times 10^{-4}$ M and $[Pu(IV)] = 10^{-2}$ M. Standard techniques were used.

| | Np (VI) | | Pu(IV) | |
|---|---|---|---|---|
| T, °C. | k', min$^{-1}$ | τ$_{99}$, min | k'$_1$, min$^{-1}$ | τ$_{99}$, min |
| 20.0 | 15.2 | 0.30 | 4.0 | 23.0 |
| 35.0 | 53.8 | 0.085 | 30.5 | 3.1 | k'= first order rate constant (Np).
k'$_1$= pseudo-first order rate constant (Pu)
τ$_{99}$= time taken for 99% reduction.

Since the yield of Np(V) increases from 3 to 4 moles per 1 mole of oxidised acetaldoxime, it is likely that the reduction of Np(VI) proceeds by two ultimate stoichiometric equations. Firstly, with a high excess of Np (VI):

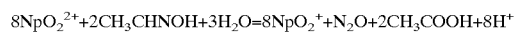

Secondly, when acetaldoxime is in excess:

$$4NpO_2^{2+} + 2CH_3CHNOH + H_2O = 4NpO_2^+ + N_2O + 2CH_3CHO + 4H^+$$

The rate of Np(VI) reduction is described by
where $k_2=254\pm10$ min-1 at 26.0° C.

$E_{ACT}=62.6\pm2.6$ kJ/mol

The rate of Pu(IV) reduction is described by $$\frac{-d[Pu(IV)]}{dt} = \frac{k[Pu(IV)]^2[CH_3CHNOH]^{1.1}}{[Pu(III)][HNO_3]^{2.2}}$$

where $k=25.3\pm1.9 M^{1.1}min^{-1}$ at 19.5° C.

$E_{ACT}=87.7\pm9.8$ KJ/mol

Table 2 shows the times of 99% ($\tau_{99}$) and 99.9% ($\tau_{99.9}$) reaction completion with Pu(IV).

TABLE 2

| T | [HNO$_3$] | [CH$_3$CHNOH] = 0.1 mole/l | | [CH$_3$CHNOH] = 0.2 mole/l | |
|---|---|---|---|---|---|
| ° C. | mole/l | $\tau_{99}$, min | $\tau_{99.9}$, min | $\tau_{99}$, min | $\tau_{99.9}$, min |
| 20 | 0.1 | 0.28 | 2.94 | 0.132 | 1.37 |
|  | 0.5 | 9.8 | 101 | 4.56 | 47.5 |
|  | 1.0 | 44.8 | 466 | 20.9 | 218 |
| 35 | 0.1 | 0.049 | 0.51 | 0.023 | 0.24 |
|  | 0.5 | 1.69 | 17.6 | 0.795 | 8.27 |
|  | 1.0 | 7.79 | 81.0 | 3.64 | 37.9 |
| 50 | 0.1 | 0.011 | 0.115 | 0.0051 | 0.054 |
|  | 0.5 | 0.38 | 3.98 | 0.179 | 1.86 |
|  | 1.0 | 1.76 | 18.3 | 0.822 | 8.55 |

EXAMPLE 2

The first and second order rate constants were determined for the reaction of butyraldoxime with NP(VI) and Pu(IV), respectively. The time of reaction completion was also determined. The results are shown in Table 2 below:

TABLE 2

Rate constants and time of reaction completion with Np(VI) and Pu(IV)
The results were determined at [C$_3$H$_7$CHNOH] = 0.1 M,, [Np(VI)] = 1.7 × 10$^{-4}$ M and [Pu(IV)] = 10$^{-2}$M.
Standard techniques were used.

| | | Np(VI) | | Pu(IV) | |
|---|---|---|---|---|---|
| T, ° C. | [HNO$_3$] M | k', min$^{-1}$ | $\tau_{99}$, min | k'$_1$, min$^{-1}$ | $\tau_{99}$, min |
| 20 | 1.0 | 14.6 | 0.32 | 0.4 | 240 |
| 35 | 1.0 | 56.5 | 0.081 | 8.0 | 12 |
| 35 | 0.8 | 70.6 | 0.065 | 19.0 | 5 |
| 35 | 0.5 | 113 | 0.041 | 126 | 0.75 |
| 40 | 1.0 | — | — | 19 | 5 |
| 40 | 0.5 | — | — | 315 | 0.3 |

Preliminary results showed that $$\frac{-d[Np(VI)]}{dt} = \frac{k_1[Np(VI)][C_3H_7CHNOH]}{[HNO_3]}$$

where $k_1=146$ and 565 min$^{-1}$ at 20° and 35° respectively.

$$\frac{-d[Pu(IV)]}{dt} = \frac{k_2[Pu(IV)][C_3H_7CHNOH]}{[Pu(IV)][HNO_3]^4}$$

$k=6.62$ mol $^3$l$^{-3}$ min$^{-1}$ at 22.5° C. and $E_{ACT}\approx130-140$ kJ/mol.

It can be seen that advantages of buyraldoxime are that the high $E_{ACT}$ and high inverse order with resect to HNO$_3$ enable rapid Pu(IV) reduction rates to be achieved by moderate increases in temperate or decreases in acidity.

What is claimed is:

1. A spent fuel reprocessing method in which an organic phase containing Np(VI) is contacted with an oxime of the formula R$_2$C=NOH, where R$_2$ is H or an organic substituent, to reduce Np(VI) to Np(V), the Np(V) is then backwashed into an aqueous phase.

2. A method of claim 1, wherein the oxime is an alkyloxime of the formula R$^1$HC=NOH where R$^1$ is an organic substituent.

3. A method of claim 1 wherein the or each organic substituent is alkyl or substituted alkyl.

4. A method of claim 1 wherein the substituted alkyl is substituted by HONH- or hydroxy.

5. A method of claim 1 wherein the or each organic substituent contains 1, 2 or 3 carbon atoms.

6. A method of claim 1 wherein the oxime is butyraldoxime.

7. A method of claim 1 wherein the oxime is acetaldoxime.

8. A method of claim 1 in which the organic phase contains U, Pu and Np, the oxime reducing Pu to Pu(III) as well as Np(VI) to Np(V), and the Pu(III) as well as the Np(V) being backwashed into the aqueous phase.

9. A method of claim 8 further comprising backwashing Pu(III) from the organic phase, and wherein the reduction using the oxime is performed after backwashing of Pu(III) from the organic phase.

10. A method for making a fissle material comprising forming Np(V) as defined by claim 1 into a fissle material.

11. A method for making a fissle material comprising forming Np(V) and Pu(III) as defined by claim 8 into a fissle material.

12. A Purex processing method, said method comprising treating active solvent feed entering a U/Pu split operation with an oxime of the formula R$_2$C=NOH, where R$_2$ is H or an organic substituent, to reduce Pu(IV) to Pu(III) and Np(VI) to Np(V) wherein Pu(III) and Np(V) are backwashed into an aqueous stream.

13. A method of claim 12 wherein the oxime is an alkyloxime of the formula R$^1$HC=NOH where R$^1$ is an organic substituent.

14. A method for making a fissle material comprising contacting an organic phase containing Pu(IV) is contacted with an oxime of the formula R$_2$C=NOH, where R$_2$ is H or an organic substituent, to reduce Pu(IV) to Pu(III), backwashing the Pu(III) into an aqueous phase, and forming the Pu(III) into a fissle material.

* * * * *

UNITED STATES PATENT AND TRADEMARK OFFICE
CERTIFICATE OF CORRECTION

PATENT NO.    : 6,413,482 B1
DATED         : July 2, 2002
INVENTOR(S)   : Baranov et al.

It is certified that error appears in the above-identified patent and that said Letters Patent is hereby corrected as shown below:

Title page,
Item [54], the title should read -- METHODS FOR REPROCESSING NUCLEAR FUEL BY EMPLOYING OXIMES --
Item [57], ABSTRACT,
Line 2, should read -- ing an organic phase containing Np(VI) with an oxime of the --

Column 3,
Line 5, should read -- contactors. --

Signed and Sealed this

Tenth Day of December, 2002

JAMES E. ROGAN
*Director of the United States Patent and Trademark Office*